United States Patent
Lee et al.

(10) Patent No.: US 7,149,357 B2
(45) Date of Patent: Dec. 12, 2006

(54) FAST INVARIANT PATTERN SEARCH

(76) Inventors: Shih-Jong J. Lee, 15418 SE. 53rd Pl., Bellevue, WA (US) 98006; Seho Oh, 5025 145th Pl. SE., Bellevue, WA (US) 98006

( * ) Notice: Subject to any disclaimer, the term of this patent is extended or adjusted under 35 U.S.C. 154(b) by 621 days.

(21) Appl. No.: 10/302,466

(22) Filed: Nov. 22, 2002

(65) Prior Publication Data
US 2004/0101199 A1 May 27, 2004

(51) Int. Cl.
*G06K 9/62* (2006.01)
(52) U.S. Cl. ............... 382/209; 382/170; 382/216
(58) Field of Classification Search ............... 382/209
See application file for complete search history.

(56) References Cited

U.S. PATENT DOCUMENTS

| | | | | |
|---|---|---|---|---|
| 4,567,610 | A * | 1/1986 | McConnell | 382/170 |
| 4,972,499 | A * | 11/1990 | Kurosawa | 382/227 |
| 6,272,247 | B1 | 8/2001 | Manickam et al. | |
| 6,529,613 | B1 * | 3/2003 | Astle | 382/103 |
| 6,640,008 | B1 * | 10/2003 | Lee et al. | 382/218 |

FOREIGN PATENT DOCUMENTS

JP 09-102039 4/1997

OTHER PUBLICATIONS

Steve Hodges, "Faster spatial image processing using partial summation" Jan. 1996 Cambridge University Engineering Department.*
Silver, B, "Geometric Pattern Matching for General-Purpose Inspection in Industrial Machine Vision", Intelligent Vision '99 Conference—Jun 28-29, 1999.
Korsheed, M et al, "Multi-font Arabic Word Recognition Using Spectral Features", Sep. 7, 2000 IEEE Proceedings ISBN:0-7695-0750, vol. 4, pp. 543-546.
Korsheed et al, "Spectral Features for Arabic Word Recognition", Jun. 9, 2000, IEEE Proceedings, ISBN: 0-7803-6293, vol. 6, pp. 3574-3577.
Ballard, DH, and Brown CM, "Computer Vision", Prentice Hall 1982, pp. 68-70.
Haralick RM and Shapiro LG, "Computer and Robot Vision", vol. 1, Addison-Wesley, 1992, pp. 371-380.

* cited by examiner

*Primary Examiner*—Joseph Mancuso
*Assistant Examiner*—Alex Liew

(57) ABSTRACT

Rotation and scale invariant profiles are generated for matching to a pattern template using a fast regular shaped pattern construction method. The invention achieves rotation invariant matching, rotation and scale invariant matching, and/or scale invariant matching. Invariant profiles are used to perform fast rotation, rotation and scale, or scale invariant search for initial detection of match candidates. The rotation invariant contours of this invention approximate circular contours through use of regular shaped patterns such as octagon or multiple rotated octagons. Rotation invariant search does not depend on rotation angles and is very fast.

10 Claims, 17 Drawing Sheets

| Case Number | Accumulation direction 1 | Accumulation direction 2 | Pattern kernel result (A1 + A2 - A3 - A4) |
|---|---|---|---|
| 1 | ↓ | → | |
| 2 | ↘ | ↙ | |
| 3 | ← | ↙ | |

|   | 1 | 2 | 3 | 4 | 5 |
|---|---|---|---|---|---|
| 1 | 1 | 1 | 1 | 1 | 1 |
| 2 | 1 | 1 | 1 | 1 | 1 |
| 3 | 1 | 1 | 1 | 1 | 1 |
| 4 | 1 | 1 | 1 | 1 | 1 |
| 5 | 1 | 1 | 2 | 1 | 1 |
| 6 | 1 | 3 | 1 | 4 | 1 |
| 7 | 1 | 1 | 1 | 1 | 1 |
| 8 | 1 | 1 | 1 | 1 | 1 |
| 9 | 1 | 1 | 1 | 1 | 1 |
| 10 | 1 | 1 | 1 | 1 | 1 |

Figure 6

|   | 1 | 2 | 3 | 4 | 5 |
|---|---|---|---|---|---|
| 1 | 1 | 1 | 1 | 1 | 1 |
| 2 | 2 | 2 | 2 | 2 | 2 |
| 3 | 3 | 3 | 3 | 3 | 3 |
| 4 | 4 | 4 | 4 | 4 | 4 |
| 5 | 5 | 5 | 6 | 5 | 5 |
| 6 | 6 | 8 | 7 | 9 | 6 |
| 7 | 7 | 9 | 8 | 10 | 7 |
| 8 | 8 | 10 | 9 | 11 | 8 |
| 9 | 9 | 11 | 10 | 12 | 9 |
| 10 | 10 | 12 | 11 | 13 | 10 |

Figure 7

|   | 1 | 2 | 3 | 4 | 5 |
|---|---|---|---|---|---|
| 1 | 1 | 2 | 3 | 4 | 5 |
| 2 | 2 | 4 | 6 | 8 | 10 |
| 3 | 3 | 6 | 9 | 12 | 15 |
| 4 | 4 | 8 | 12 | 16 | 20 |
| 5 | 5 | 10 | 16 | 21 | 26 |
| 6 | 6 | 14 | 21 | 30 | 36 |
| 7 | 7 | 16 | 24 | 34 | 41 |
| 8 | 8 | 18 | 27 | 38 | 46 |
| 9 | 9 | 20 | 30 | 42 | 51 |
| 10 | 10 | 22 | 33 | 46 | 56 |

Figure 8

|   | 1 | 2 | 3 | 4 | 5 |
|---|---|---|---|---|---|
| 1 | 1 | 1 | 1 | 1 | 1 |
| 2 | 1 | 1 | 1 | 1 | 1 |
| 3 | 1 | 1 | 1 | 1 | 1 |
| 4 | 1 | 1 | 1 | 1 | 1 |
| 5 | 1 | 1 | 2 | 1 | 1 |
| 6 | 1 | 3 | 1 | 4 | 1 |
| 7 | 1 | 1 | 1 | 1 | 1 |
| 8 | 1 | 1 | 1 | 1 | 1 |
| 9 | 1 | 1 | 1 | 1 | 1 |
| 10 | 1 | 1 | 1 | 1 | 1 |

Figure 9

|   | 1 | 2 | 3 | 4 | 5 |
|---|---|---|---|---|---|
| 1 | 1 | 2 | 3 | 4 | 5 |
| 2 | 2 | 4 | 6 | 8 | 10 |
| 3 | 3 | 6 | 9 | 12 | 15 |
| 4 | 4 | 8 | 12 | 16 | 20 |
| 5 | 5 | 10 | 16 | 21 | 26 |
| 6 | 6 | 14 | 21 | 30 | 36 |
| 7 | 7 | 16 | 24 | 34 | 41 |
| 8 | 8 | 18 | 27 | 38 | 46 |
| 9 | 9 | 20 | 30 | 42 | 51 |
| 10 | 10 | 22 | 33 | 46 | 56 |

FAST INVARIANT PATTERN SEARCH

TECHNICAL FIELD

This invention relates to a method for fast pattern searching of an image.

BACKGROUND OF THE INVENTION

Pattern search is a simple yet powerful machine vision tool. Given a template pattern and an image, its objective is to find all instances of the patterns in the image. It involves two steps, a search step and a match step. The search step places the pattern at all valid poses (locations, rotation angles), and scales of the image being searched. The match step determines the goodness of the match between the pattern at a given pose and scale and the subset of the image corresponding to the pose and scale. The normalized correlation method (Ballard D H and Brown C M, "Computer Vision", Prentice Hall 1982, pp. 68–70) of fixed rotation and scale has been widely used as the matching method in many machine vision applications. The match score of normalized correlation is largely independent of linear variations in object shading caused by reflectivity or illumination variations. However, pattern search based on a normalized correlation method is inherently computationally demanding since it requires operations between two (pattern and image) two-dimensional regions on all valid image locations. Even with the state-of-the-art computers, it is still difficult to achieve real-time performance when the image or pattern size is large. Furthermore, it does not work well when the pattern being searched is subject to rotation and/or size/aspect ratio variations. The match score could drop significantly even if only a few degrees of rotation or a few percent of size change occurs. One prior art approach to rotation and scale invariance is to rotate and scale the pattern template and try all possible scale and rotation combinations. However, this imposes an even greater computational demand that cannot be accomplished using normalized correlation.

Another prior art approach is the use of a geometric pattern matching method such as PatMax introduced by Cognex (Silver B, "Geometric Pattern Matching for General-Purpose Inspection in Industrial Machine Vision", Intelligent Vision '99 Conference, Jun. 28–29, 1999). This approach uses geometric information in place of pixel grid-based correlation. For example, it interprets a square as four line segments and a football as two arcs. It extracts key geometric features within an object image such as boundary encoding and measures characteristics such as shape, dimensions, angle, arcs, and shading. It then corresponds the spatial relationships between the key features of the pattern template and the new image. However, this prior art approach requires high edge contrast and low noise between patterns and background to reliably extract the key geometric features. It fails when edges of a pattern are not well defined. This is the inherent problem when using the geometric approach in place of any pixel grid based approach.

A rotation and scale invariant pattern matching method was disclosed (Shih-Jong J. Lee et. al., "A Rotation and Scale Invariant Pattern Matching Method", U.S. patent application Ser. No. 09/895,150 filed Apr. 10, 2002) that generates a polar coordinate representation of the pattern template image thereby allows for fast linear search of scale along the radius axis and rotation along the angular axis. Fast search can be achieved by projecting image intensities into the radius axis for scale search and projecting image intensities into the angular axis for rotation angle search. However, this method requires that the polar coordinate transformation be performed on each image region where the rotation and scale invariant pattern matching method is applied. This could be time consuming if image regions centered at all positions of an image are subjected to the search. It is desirable to have a fast initial invariant search method that quickly identifies a reduced set of image positions where the finer rotation and scale invariant pattern matching method can be applied.

Furthermore, the speed of prior art invariant search method depends on the range of rotation angles that need to be searched. It is time consuming when the rotation angle search range is large. It is desirable to have an invariant search method that does not depend on the rotation angle search range.

A fast regular shaped pattern search method was disclosed (Shih-Jong J. Lee et. al., "Fast Regular Shaped Pattern Searching", U.S. patent application Ser. No. 10/255,016 filed on Sep. 24, 2002) that performs fast pattern matching with flexible projection kernels to construct regular-shaped patterns using an accumulation method. This invention generates rotation and scale invariant profiles using the fast regular shaped pattern construction method. The rotation and scale invariant profiles are then used to perform fast invariant search for initial detection of the match candidates.

OBJECTS AND ADVANTAGES

The rotation invariant contours of this invention achieve rotation invariant search independent of the rotation angle search range. This invention can be easily generalized to three-dimensional or higher dimensional invariant pattern search and can achieve even greater speed advantage compared to the prior art methods. Therefore, it can be used in applications such as 3D medical imaging, dynamic medical imaging studies, confocal microscopy, live cell assays in drug discovery, or ultrasound imaging. This invention is especially efficient when multiple template patterns are searched simultaneously since only one set of rotation and scale invariant contours could support the search of many different patterns. A further objective of this invention is to allow the software implementation of the fast invariant search method in a general computer platform such as PC, e-appliance, or PDA without any special hardware to reduce cost and system complexity.

SUMMARY OF THE INVENTION

A fast invariant matching method receives an input image and at least one pattern template. A fast invariant pattern search method uses the input image and pattern template image to create an initial match result output. A refined invariant match uses the initial match result and the pattern template to create an invariant match result. The initial pattern search method uses a transformation of the input image to rapidly determine the initial match result output.

BRIEF DESCRIPTION OF THE DRAWINGS

The preferred embodiment and other aspects of the invention will become apparent from the following detailed description of the invention when read in conjunction with the accompanying drawings which are provided for the purpose of describing embodiments of the invention and not for limiting same, in which:

FIG. 6 shows an example input image having 50 pixels with labeled values;

FIG. 7 shows a Y accumulation performed on the image of FIG. 6;

FIG. 8 shows a XY accumulation performed on the image of FIG. 6;

FIG. 9 shows an example computation of the correlation values for the input image of FIG. 6 and the rectangular pattern template of FIG. 4;

FIG. 10 shows the dual accumulation image of FIG. 8 with highlighted pixel values that are used for computing the correlation result;

FIG. 20B is a 22.5 degree rotated version of FIG. 20A;

DETAILED DESCRIPTION OF THE INVENTION

I. Application Scenarios

Figure 1:
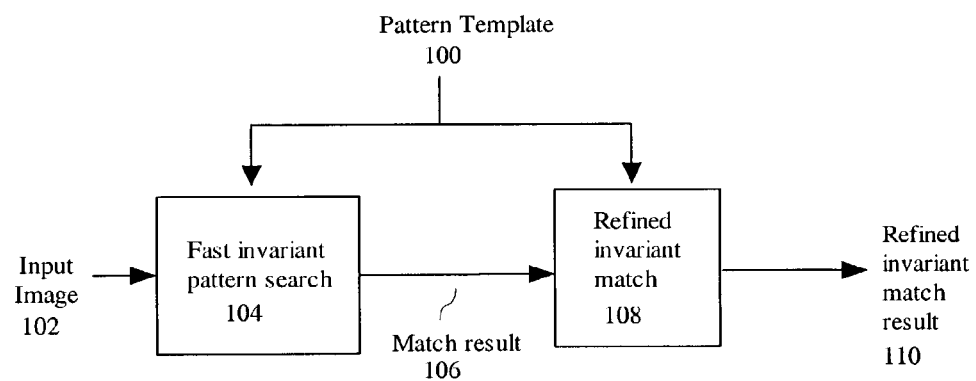
FIG. 1 shows an application method for fast invariant matching.

The application scenario of this invention is shown in FIG. 1. The input image 102 and a pattern template 100 is received by the fast invariant pattern search method 104 of this invention, which generates a match result 106. The match result points to the match candidates that should include all true matches and some false matches. The refined invariant match step 108 receives the pattern template 100, which is applied only to the match result 106 to perform refined search and thereby reject the false matches and confirm the true matches. This results in a refined invariant match result 110. In one embodiment of the invention, the rotation and scale invariant pattern matching method (Shih-Jong J. Lee et. al., "A Rotation and Scale Invariant Pattern Matching Method", U.S. patent application Ser. No. 09/895, 150 filed Apr. 10, 2002) is used for refined invariant match 108. Those skilled in the art should recognize that other methods such as geometric pattern matching could be used for refined invariant match.

II. Fast Invariant Pattern Search

Figure 2:
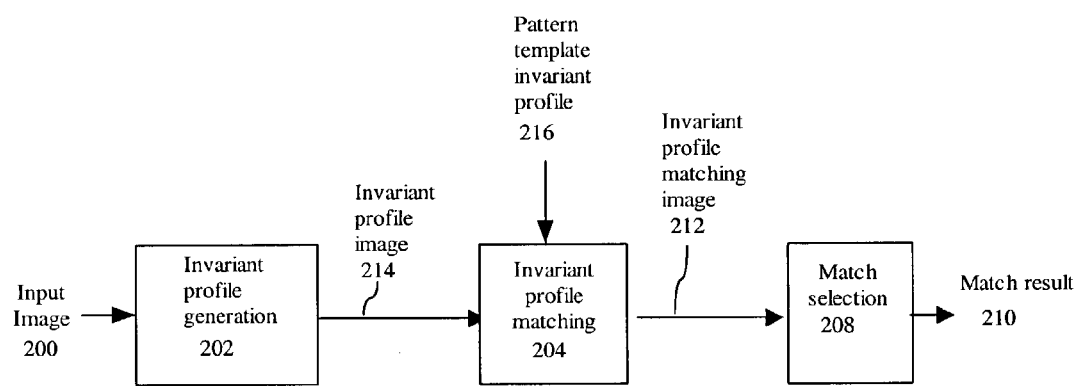
FIG. 2 shows the processing flow for the fast invariant pattern search method.

The processing flow of the fast invariant pattern search method of this invention is shown in FIG. 2. This consists of an invariant profile generation step 202, an invariant profile matching step 204, and a match selection step 208. The input image 200 is subjected to an invariant profile generation step 202 that generates at least one invariant profile image 214 that could be a set of images or a single expanded image. The invariant profile image 214 is invariant profile matched 204 with at least one pattern template invariant profile 216 to create invariant profile matching image 212. The invariant profile matching image 212 is processed by a match selection step 208 that selects the good matches and outputs the match result 210.

III. Invariant Profile Generation

Figure 3A:
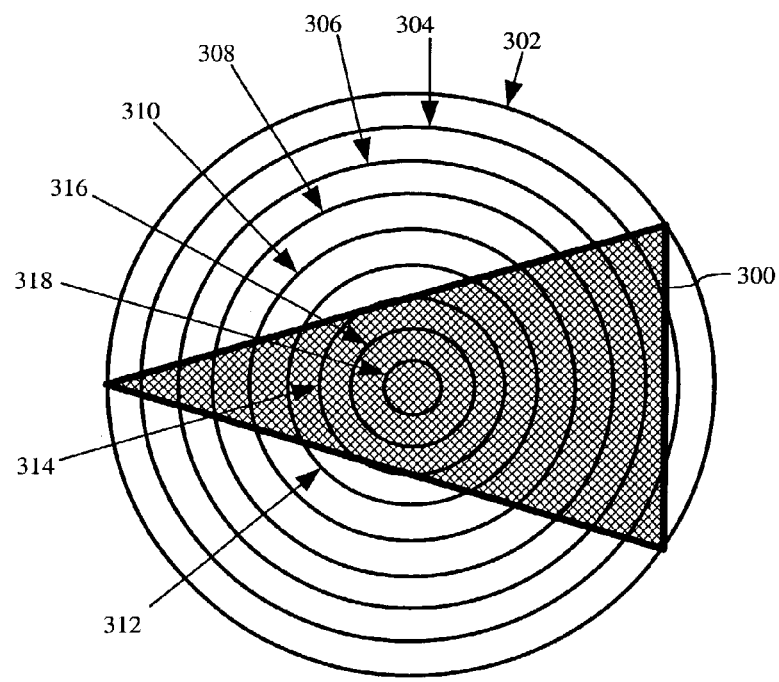
FIG. 3A shows an illustration of the circular profile projection for a triangle of one orientation having the normalized projection profile as shown in FIG. 3E.
Figure 3B:
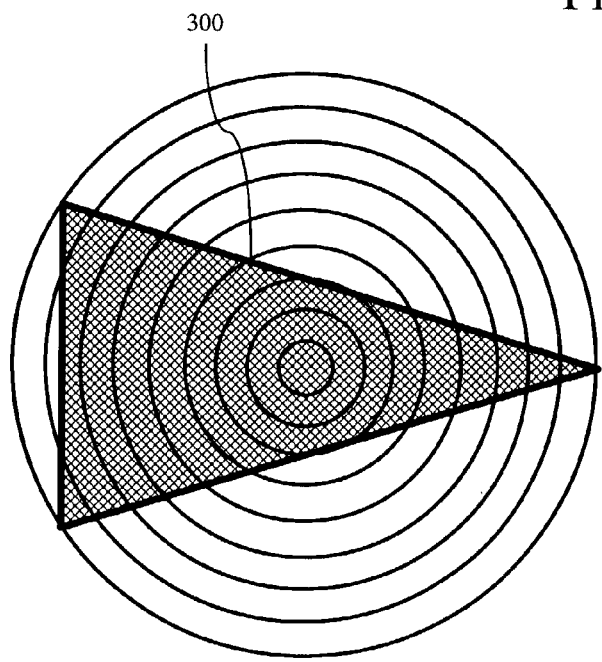
FIG. 3B shows an illustration of the circular profile projection for the same triangle of FIG. 3A but with a different orientation, having the same normalized projection profile as shown in FIG. 3E.
Figure 3C:
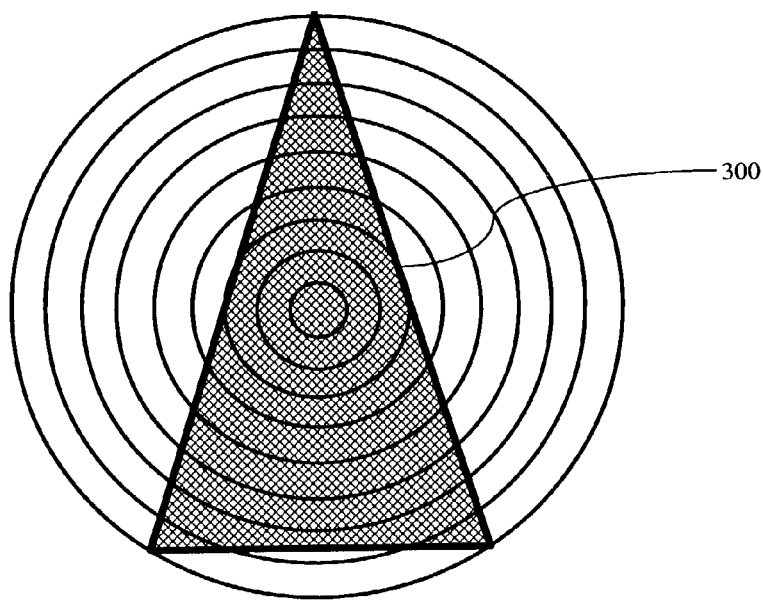
FIG. 3C shows an illustration of the circular profile projection for the same triangle of FIG. 3A, and FIG. 3B but with a different orientation, having the same normalized profile shown in FIG. 3E.
Figure 3D:
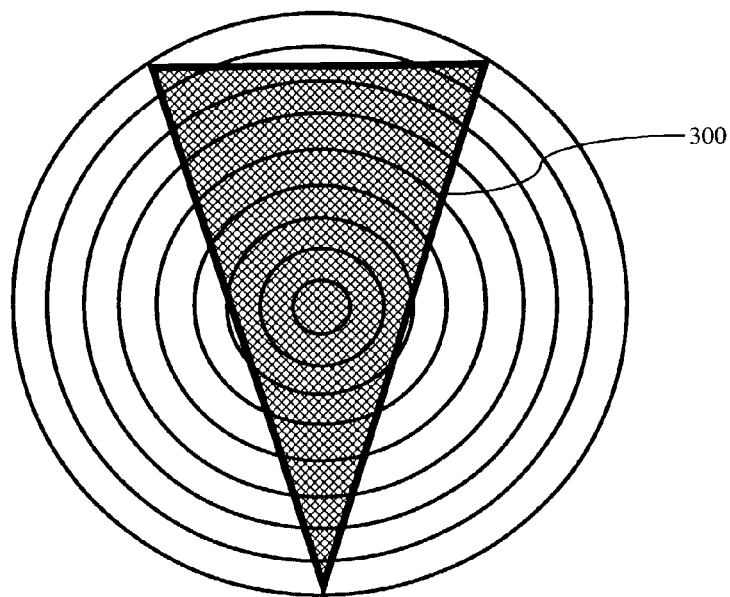
FIG. 3D shows an illustration of the circular profile projection for the same triangle of FIG. 3A, FIG. 3B, and FIG. 3C but with a different orientation, having the same normalized projection profile shown in FIG. 3E.

Refer to FIG. 3A. A rotation invariant profile can be generated for an image region by projecting the region into circular contours 302, 304, 306, 308, 310, 312, 314, 316, 318. The projection operation accumulates the image pixel values along each contour region corresponding to a radius. In FIG. 3A an example image of a triangle 300 is superimposed on the contour regions. Accumulation of the triangle image pixel values along each radius contour is the simple sum of all pixels within the contour that fall under the triangle. The accumulation result for each region plotted as a function of radius bin is the projection profile of the region. The projection profile is normalized to remove the unequal area effect of different radius contours (FIG. 3E).

Figures 3E, 4, 5:
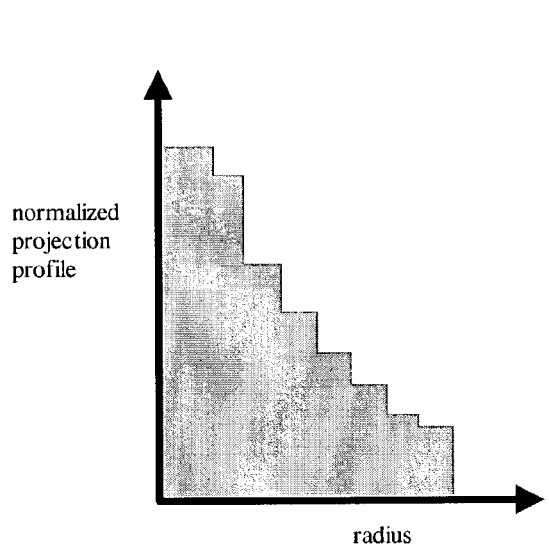
FIG. 3E shows the normalized projection profile for the triangle common to FIGS. 3A, 3B, 3C, and 3D.
FIG. 4 shows an example rectangular pattern template of 24 pixels with labeled values.
FIG. 5 shows some example double accumulation transformations and their pattern kernel result.

As illustrated in FIGS. 3A, 3B, 3C, 3D, a triangle 300 of four different orientations has the same normalized projection profile, which is shown in FIG. 3E. The values in the bins of the normalized projection profile are the sum of pixel intensities divided by the number of pixels contained in the corresponding circular contour regions of different radii. In this illustration, the pixels within the shaded triangle 300 have equal high intensity values and those external to the triangle are zero.

IIIa. Construction of an Accumulation Image

In this invention, the circular contours are approximated by regular-shaped patterns such as octagon or multiple octagons. The regular-shaped patterns can be constructed using the accumulation method as disclosed in "Fast Regular Shaped Pattern Searching", U.S. patent application Ser. No. 10/255,016 by Shih-Jong J. Lee et. al., filed Sep. 24, 2002, which is incorporated in its entirety herein. Given an input image, the accumulation transformation accumulates the image values along one or multiple directions. For two-dimensional pattern kernel construction, at least one dual accumulation image is used for the construction. More dual accumulation images are used if the construction of complicated two-dimensional patterns whose shapes involve many different angles is desired. To explain the concept of the invention, the generation of a simple dual accumulation image along Y and X directions is illustrated.

Let the single accumulation in Y direction be $$A_Y[x][1]=I[x][1] \text{ for all } x \text{ and}$$

$$A_Y[x][y]=A_Y[x][y-1]+I[x][y].$$

Where I[x][y] is the pixel value of the input image at position [x][y] and $A_y$[x][y] is the pixel value of the Y direction accumulation image at position [x][y]. We assume that the pixel index of y starts from 1.

The dual accumulation in X and Y directions are $$A_{XY}[1][y]=A_Y[1][y] \text{ for all } y \text{ and}$$

$$A_{XY}[x][y]=A_{XY}[x-1][y]+A_Y[x][y].$$

Where $A_{XY}$[x][y] is the pixel value of XY dual accumulation image at position [x][y]. We assume that the pixel index of x starts from 1.

The accumulation transformation can be easily generalized to higher dimensions. For example, a triple accumulation along X, Y, and Z directions can be constructed by $$A_{XYZ}[x][y][1]=A_{XY}[x][y][1] \text{ for all } z \text{ and}$$

$$A_{XYZ}[x][y][z]=A_{XYZ}[x][y][z-1]+A_{XY}[x][y][z].$$

where $A_{XYZ}$[x][y][z] is the pixel value of XYZ triple accumulation image at position [x][y][z]. We assume that the pixel index of z starts from 1.

The directions of the accumulation transformation can be determined from the input pattern template specification. For example consider a simple rectangular pattern template of equal value as shown in FIG. 4. A simple rectangular pattern requires only accumulations along Y and X directions as shown in case 1 of FIG. 5. Using the example input image shown in FIG. 6, a Y accumulation image FIG. 7 and an XY dual accumulation image FIG. 8 are computed. For the example template in FIG. 4 positioned at the center of the example input image, FIG. 6, the correlation result is the sum of the pixels highlighted in FIG. 9. In this example, the sum is 30. Alternatively, the same result could be obtained by using only the pixels highlighted in the dual accumulation image 320, 322, 324, 326 in FIG. 10, to compute as follows:

$$\text{Correlation result} = A1 + A2 - A3 - A4$$
$$= 42 + 1 - 4 - 9$$
$$= 30$$

Note the unit position shifts from the vertexes of the correlation area. As indicated in FIG. 5 cases 2 and 3, diamond shaped patterns require accumulations along two diagonal directions. Other complicated patterns may require the creation of accumulation transformation images along multiple angular directions in order to compute the pattern template specification result.

Those skilled in the art should recognize that accumulation images along different accumulation directions or with different coordinate structures (such as r, θ or r,θ,Φ), can be similarly constructed and they will provide useful results as will become clear in the subsequent sections.

IIIb Pattern Construction

Figure 11:
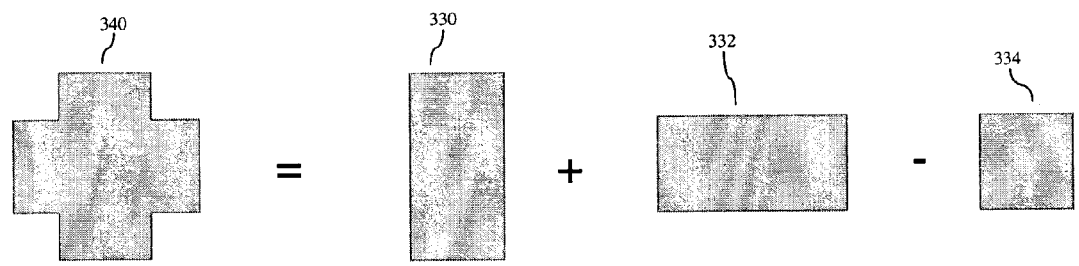
FIG. 11 shows an example pattern construction method for a cross pattern.
Figure 13:
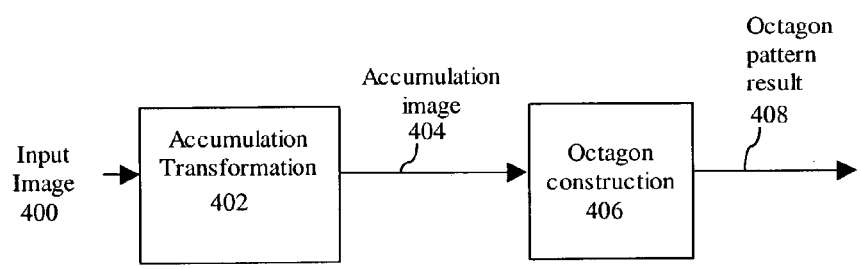
FIG. 13 shows a method for fast octagon pattern construction using an accumulation image.
Figure 12:
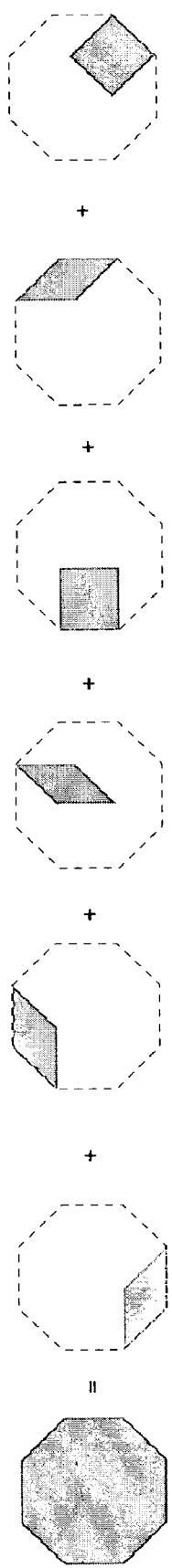
FIG. 12 shows an illustration of octagon pattern construction using a combination of basic shapes.

Many different patterns can be constructed by a combination of basic shapes. As shown FIG. 11, adding two rectangular shapes 330, 332 and subtracting a square shape 334 can construct a cross pattern 340. In this case, only one accumulation image is needed since rectangles and square can all be derived from $A_{xy}$ (case 1 of FIG. 5). Similarly, in FIG. 12 the construction of an octagon example pattern is shown graphically using a set of basic shapes. More than one accumulation image is needed to construct the desired pattern because of the number of differing shapes involved. As shown in FIG. 13, the input image is received 400 and at least one accumulation transformation 402 produces accumulation images 404 that are processed by an octagon construction step 406 to output an octagon pattern result 408. The octagon pattern result 408 is an image with each of its pixel values corresponding to the sum of the input image pixels over the octagon region when centered at each of its pixel locations. This sum is rapidly determined through use of an accumulation transformation.

The choice of an octagon kernel with unit pixels (all pixels=1) facilitates the easy calculation of the projection pattern determination, making the determination of projection images fast compared to the alternative, which is to directly sum the pixels within the contours. The octagon is selected for this embodiment because it usefully approximates the circular pattern used to form contours for developing the projection pattern.

Figure 14:
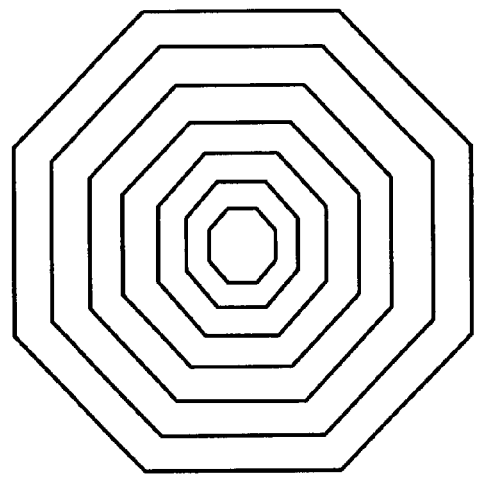
FIG. 14 shows an octagon contour set.

The matching profiles of an octagon contour set are constructed from same orientation octagons of different sizes. FIG. 14 shows an octagon contour set example. Note that same orientation octagons of different sizes could be constructed from the same accumulation images. Therefore, they can be created efficiently. Those skilled in the art should recognize that other patterns could be used to approximate circular contours such as hexagon or complicated regular shapes having more than 8 sides as well as irregular shapes.

Figure 15:
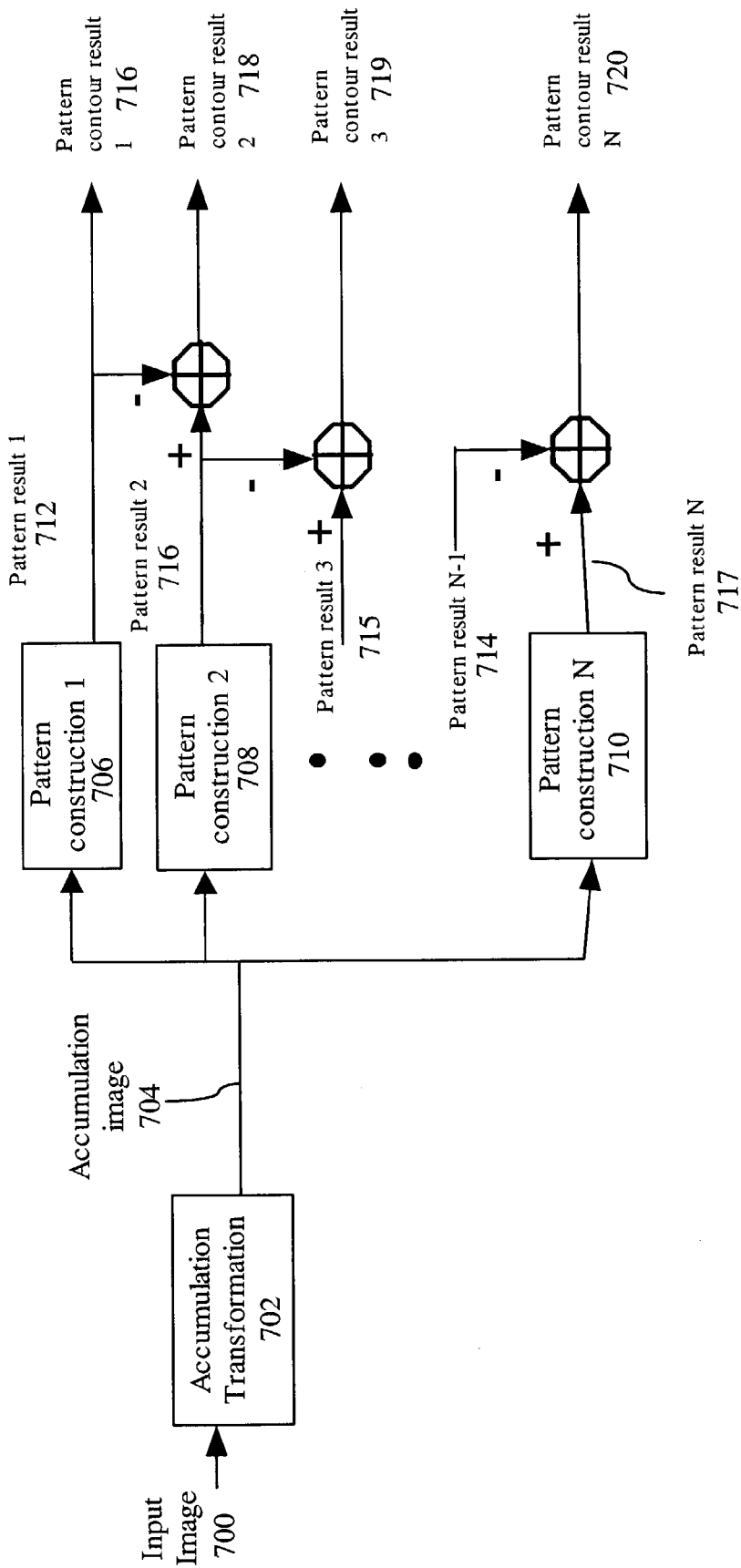
FIG. 15 shows the pattern contour set creation process.
Figure 16:
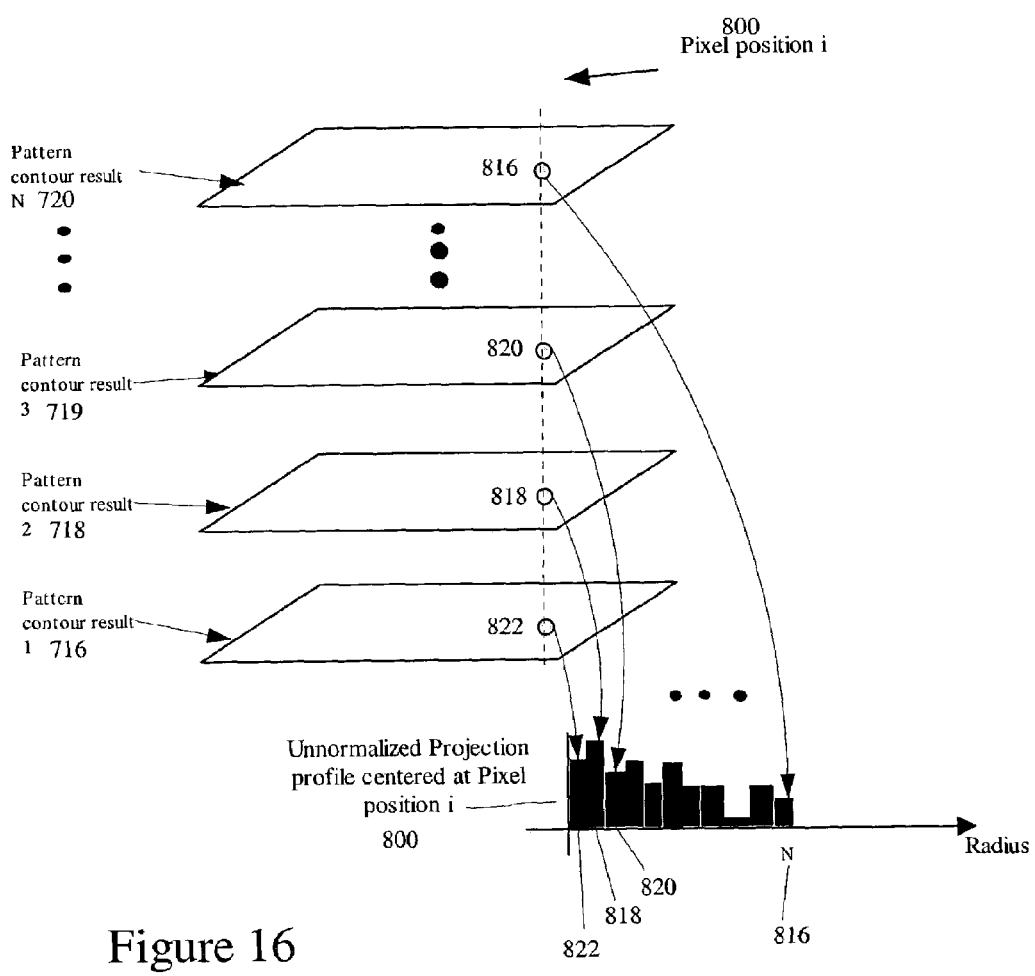
FIG. 16 shows an illustration of pattern contour set correspondence to a projection profile.

The pattern contour set creation process is shown in FIG. 15. The input image 700 is first subjected to the accumulation transformation 702 to create accumulation image(s) 704. The same accumulation image(s) is(are) used for multiple pattern construction steps 706, 708, . . . 710 of progressively increasing sizes. That is, the pattern constructed at pattern construction step i is bigger than the pattern constructed at pattern construction step i-1. The pattern result i 712, 716, 715, 714 . . . 717 is an image whose pixel values are the sum of the input image around the pattern region having size corresponding to step i and centered at each of the input image pixel locations. The pattern contour result i 716, 718, 719, . . . 720 is generated by subtracting pattern result i-1 from pattern result i. This is an image whose pixel values is the sum of the input image around pattern contour region having size corresponding to step i and centered at each of the input image pixel locations. Note that pattern contour result 1 is identical to pattern result 1 since it is the central region of the pattern contour set. Therefore, the grouping of the pattern contour result images forms a multi-band image where the multiple bands at a pixel location correspond to the un-normalized projection profile values for the pattern contour set centered at each input image pixel location. This is illustrated in FIG. 16. The pixel values at pixel position i 800 from different pattern contour results 716, 718, 719, . . . 720 form the un-normalized projection profile centered at pixel position i 800 and having bin values 822, 818, 820, . . . 816 corresponding to the multiband image pixel values.

Figure 17:
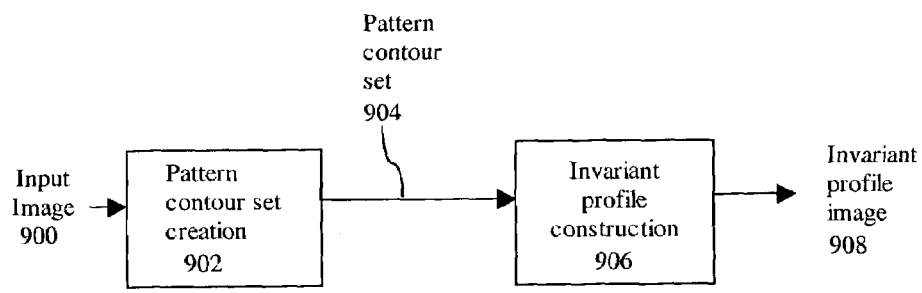
FIG. 17 shows one embodiment of the invariant profile generation step.

FIG. 17 shows one embodiment of the invariant profile generation step that involves one pattern contour set. An input image 900 is received by a pattern contour set creator 902 to construct a pattern contour set 904. The invariant profile generation step 906 constructs invariant profile image 908 from at least one pattern contour set 904.

The invariant profile construction step 906 assembles the pattern contour set 904 in a convenient way for a follow-on invariant profile matching step. The preferred manner of the assembly is computing platform dependent. In one embodiment of the invention, the pattern contour set is grouped into multi-band images and the multi-band values of each image location correspond to the projection profile to be matched against as the result of the invariant profile construction step.

Figure 18:
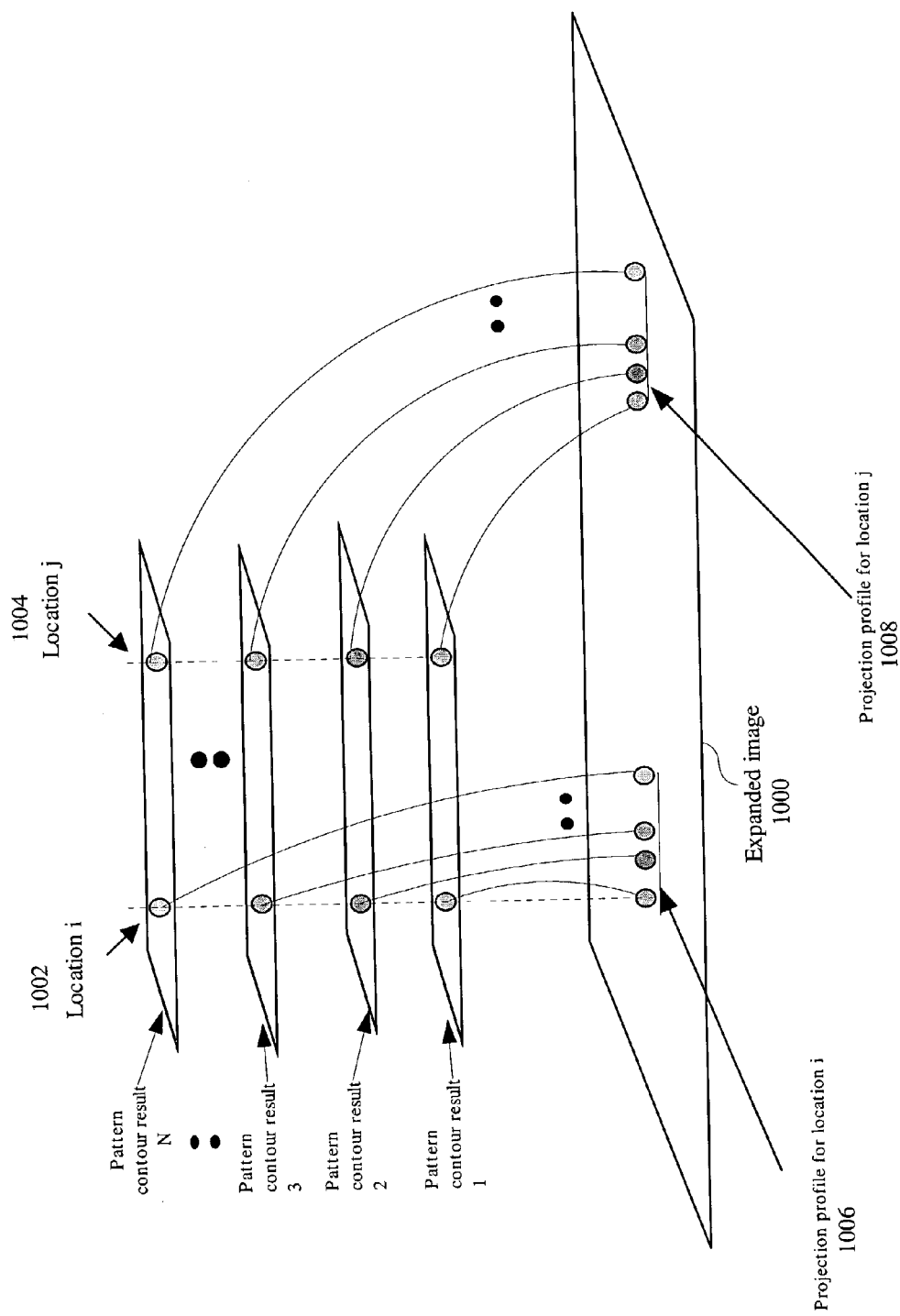
FIG. 18 shows an illustration of the creation of an expanded image containing pattern profiles.

In another embodiment of the invention, illustrated in FIG. 18, an expanded image is created. The contour set is first grouped into a multi-band image. Then, the projection profile values that are at the same location of the multi-band image are copied into consecutive pixel locations in the expanded single band image. This could provide more efficient memory access in computing platforms where memory access capability is slow for multiple bands. As shown in FIG. 18, the pattern contour result values for locations i 1002 and j 1004 are copied to the corresponding locations 1006, 1008 of the expanded image 1000.

Figure 19:
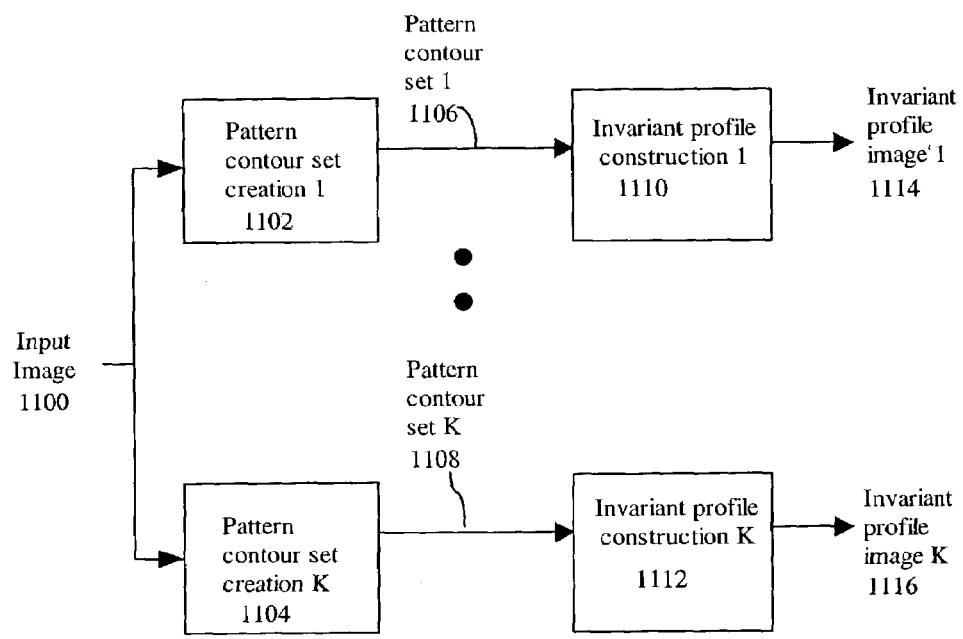
FIG. 19 shows another embodiment of the invariant profile generation step that involves multiple pattern contour sets.

To achieve better approximation to circular contours, the invariant profile generation step could construct an invariant profile image from multiple pattern contour sets. FIG. 19 shows one embodiment of the invariant profile generation step that involves K pattern contour sets. As shown in FIG. 19, an input image 1100 is used by multiple pattern contour creators 1102, . . . 1104 (such as octagon, hexagon, etc. and rotated versions thereof) to create pattern contour sets 1106, . . . 1108 and invariant profile construction steps 1110, . . . 1112 are applied to create each of the K invariant profile images 1114, . . . 1116.

Figure 20A:
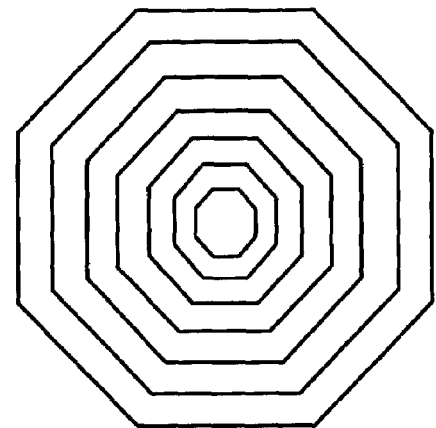
FIGS. 20A, 20B shows two octagon contour sets that taken together could achieve better approximation of the circular contour set.
Figure 20B:
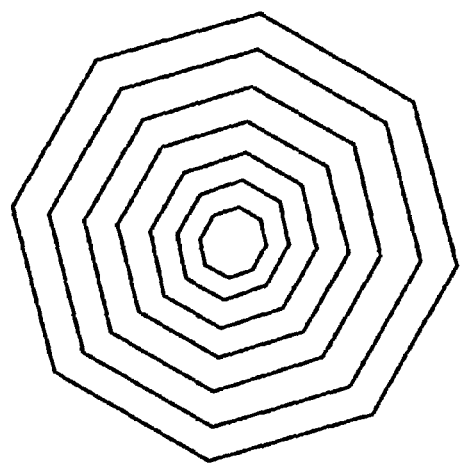

FIG. 20A and FIG. 20B show two octagon contour sets that in combination could achieve a better approximation of the circular contour set than a single octagon contour set. In this example, the second octagon contour set is a 22.5 degree rotated version of the first octagon contour set. Those skilled in the art should recognize that an even better approximation could be achieved using more contour sets; each is rotated from another set by a small angle. The combination method will be described in the next section. Those skilled in the art should recognize that the invariant profile can be the projection profile or normalized projection profile. When normalized projection profile is desired, each pattern contour result image is multiplied by a corresponding normalization factor that, in one embodiment of the invention, equals one over the number of pixels contained in the corresponding pattern contour.

IV. Invariant Profile Matching

In simple form, the profile of a pattern template is generated and then compared against profiles for every region of an input image. The computations required to accomplish this are considerably reduced through use of the accumulation transformation. The invariant profile matching step matches the invariant profile image(s) with the pattern template invariant profile. It results in an invariant profile matching image. There are rotation invariant matching, rotation and scale invariant matching, and scale invariant matching.

IV.1. Rotation Invariant Matching

We first describe the rotation invariant profile matching in the case of a single pattern contour set. The pattern template rotation invariant profile of the given pattern contour set is generated for matching. The pattern template rotation invariant profile is generated when the pattern contour set is used to extract the projection profile values from the pattern template image. The pattern template rotation invariant profile only has to be generated once during the setup or initial teaching phase. It can then be stored and reused for rotation invariant matching of new images. When a simple rotation invariant profile cross product method is used for matching, the rotation invariant matching for the multi-band invariant profile image performs the following operation for each pixel location of the multi-band image:

$$\text{Cross\_product}(\text{Pattern}, \text{Profile}) = \sum_{i=1}^{N} \text{Pattern}[i] * \text{Band}[i]$$

Where we assume there is N number of pattern contours and the pattern template invariant profile value corresponding to contour i is designated as Pattern[i]. The image band corresponding to contour i is designated as Band[i]. The rotation invariant profile matching image is the image containing the cross_product(Pattern, Profile) for each pixel location. Pattern[i] is fixed (a constant) for a given pattern template image. Therefore, the rotation invariant profile matching image can be efficiently generated as a weighted sum of the multiple image bands where the weight for an image band, Band[i], is Pattern[i].

When the normalized projection profile is used, the weighting factor for a Band[i] is fixed and can be multiplied with Pattern[i] in advance. Therefore, only one weighted sum of the raw multi-band images is required to achieve rotation invariant matching of the normalized projection profile. Note that in this case, a normalized projection profile rather than raw projection profile has to be generated for the pattern template. That is, Pattern[i] is normalized before multiplying with the weighting factor.

When the rotation invariant profile image is represented by a single band expanded image, those skilled in the art should be able to perform the invariant profile matching using a similar method.

Note that other match methods such as normalized correlation could be used. The use of other match methods will be discussed in section IV.4.

IV.1a Use of Multiple Pattern Contour Sets

Figure 21:
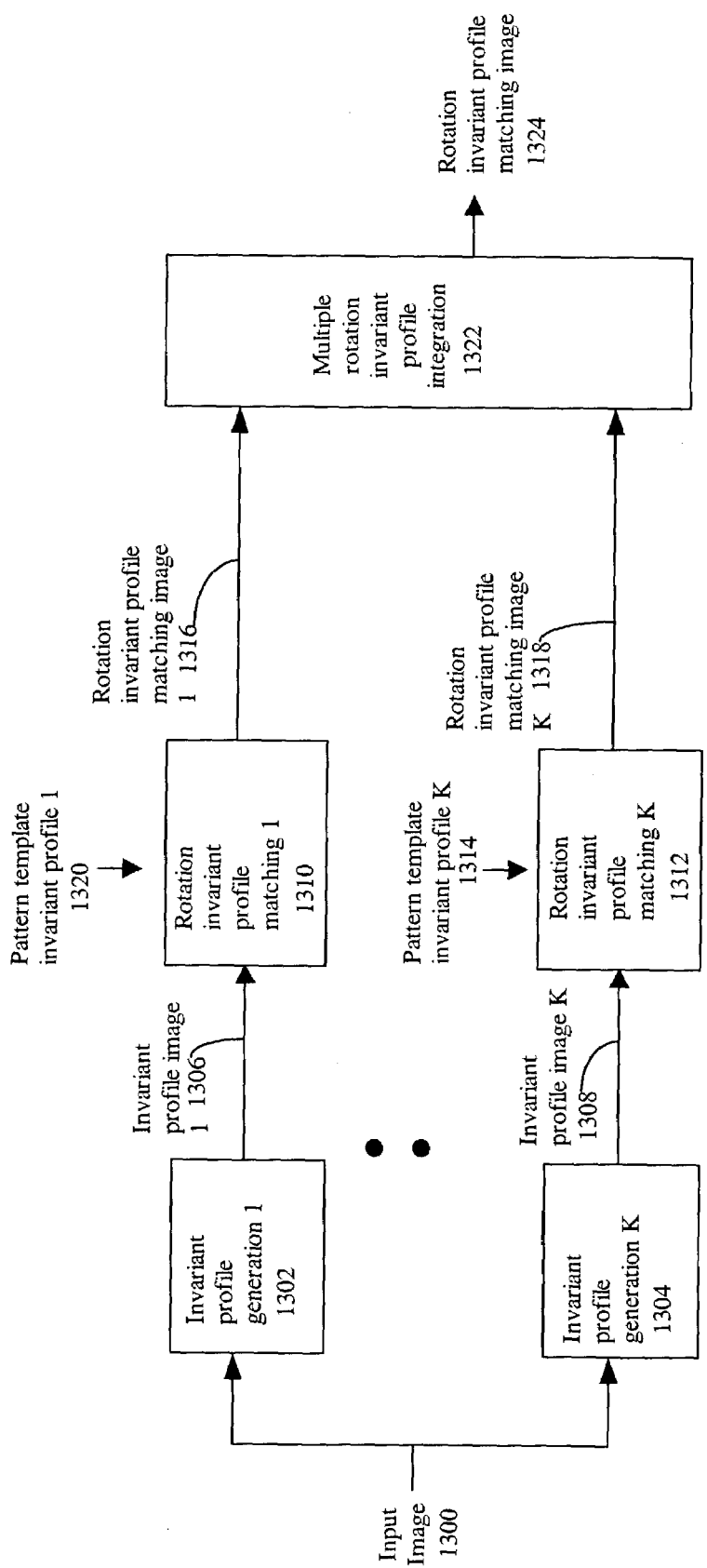
FIG. 21 shows the processing flow of rotation invariant profile matching using multiple pattern contour sets.

Multiple pattern contour sets can be used to closer approximate the result that would be obtained if circular contours were used. When multiple pattern contour sets are used, the pattern template rotation invariant profile of each of the pattern contour sets is generated for matching. The pattern template rotation invariant profiles are generated when each of the pattern contour sets is used to extract the projection profile values from the pattern template image. The pattern template rotation invariant profiles only have to be generated once during the setup or initial teaching phase. They can then be stored and re-used for rotation invariant matching of new images. The rotation invariant profile matching can be performed for each pattern contour set. This results in multiple rotation invariant profile matching images, each corresponding to a pattern contour set. The combined rotation invariant profile matching image can be generated by integration of the multiple rotation invariant profile matching images. The processing flow for integration is shown in FIG. 21.

An input image 1300 is received by invariant profile generation steps 1302, ... 1304 to produce invariant profile images 1306, ... 1308. The invariant profile images are compared to pattern template invariant profiles 1320, ... 1314 in a rotation invariant profile matching step 1310, ... 1312 to output rotation invariant profile matching images 1316, ... 1318. The rotation invariant profile matching images are combined by a multiple rotation invariant profile integration step 1322 that generates the rotation invariant profile matching image 1324.

In one embodiment of the invention, the multiple rotation invariant profile integration step takes the maximum of the multiple rotation invariant profile matching images as follows:

$$I_{\text{combined\_rotation\_invariant\_profile\_matching}}[x][y] = \underset{i=1}{\overset{K}{\text{Max}}} I_{\text{rotation\_invariant\_profile\_matching}}[i][x][y]$$

Where $I_{rotation\_invariant\_profile\_matching}[i]$ is the $i^{th}$ rotation invariant profile matching image. [x][y] is the x and y coordinates of an image. The maximum operation achieves the highest sensitivity to all possible matches. This serves the purpose of the initial match. As shown in FIG. 1, these initial match results 106 are processed by the refined invariant match step 108. Conversely in another embodiment of the invention, if minimizing false alarms is desirable, the rotation invariant profile integration step 1322 takes the minimum of the pixel values for the multiple rotation invariant profile matching images.

Those having ordinary skill in the art should recognize other methods of multiple rotation invariant profile integration could be used such as averaging, weighted averaging, etc.

Note that the rotation invariant profile based matching method can handle rotations of any angle. Its computation requirement is independent of any searched rotation angle range.

IV.2. Rotation and Scale Invariant Matching

Figure 22:
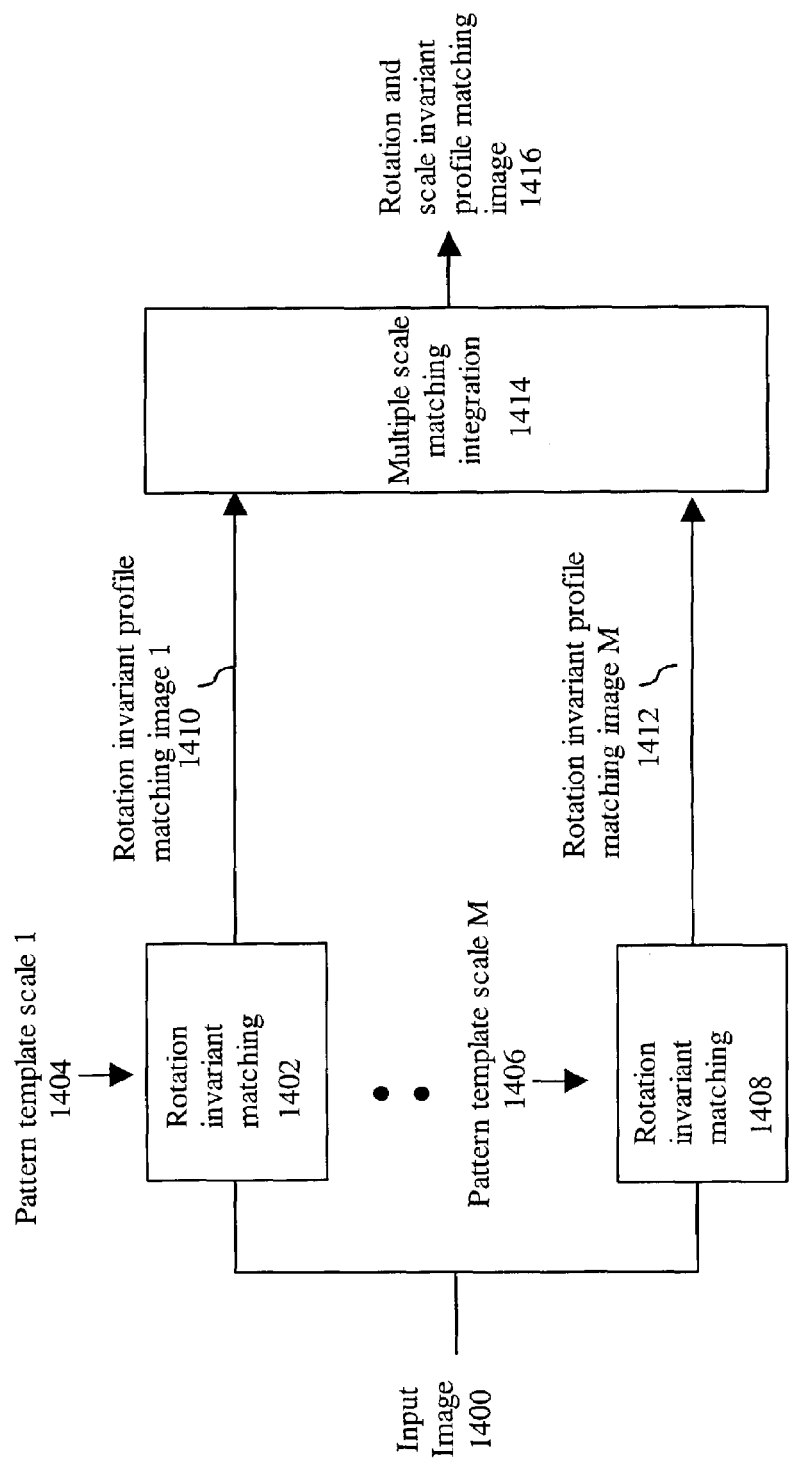
FIG. 22 shows the processing flow of rotation and scale invariant profile matching.

To achieve rotation and scale invariant matching, multiple pattern templates of different scales are used for rotation invariant matching. The rotation invariant matching results for pattern templates of different scales are then combined to create a rotation and scale invariant matching output. The rotation and scale invariant matching processing flow is shown in FIG. 22.

An input image 1400 and pattern templates of scales 1 1404 through M 1406 are used for rotation invariant matching 1402, ... 1408. In one embodiment of the invention, the rotation invariant matching process described in section IV.1 is used to generate a rotation invariant profile matching image for each scale 1410, ... 1412. The multiple rotation invariant profile matching images of different scales are combined by a multiple scale matching integration step 1414 to output a rotation and scale invariant profile matching image 1416.

In one embodiment of the invention, the multiple scale matching integration step takes the maximum of the multiple rotation invariant profile matching images normalized by their scale normalization factors as follows:

$$I_{\text{combined\_rotation\_and\_scale\_invariant\_profile\_matching}}[x][y] = \underset{i=1}{\overset{K}{\text{Max}}} I_{\text{rotation\_invariant\_profile\_matching}}[i][x][y] * s[i]$$

Where $I_{rotation\_invariant\_profile\_matching}[i]$ is the $i^{th}$ rotation invariant profile matching image. [x][y] is the x and y coordinates of an image. s[i] is the scale normalization factor that removes the scale effect in cross correlation. In one embodiment of the invention, s[i] is simply 1 over the total number of pixels in the pattern template of scale i. The maximum operation achieves the highest sensitivity to all possible matches at different scales. This serves the purpose of the initial match. The initial match results are processed by the refined rotation and scale invariant match step. Conversely in another embodiment of the invention, if minimizing false alarms is desirable, the multiple scale matching integration step takes the minimum of the multiple rotation invariant profile matching images normalized by their scale normalization factors.

Those having ordinary skill in the art should recognize other methods for the multiple scale matching integration step could be used such as averaging, weighted averaging, etc.

IV.3. Scale Invariant Matching

Figure 23:
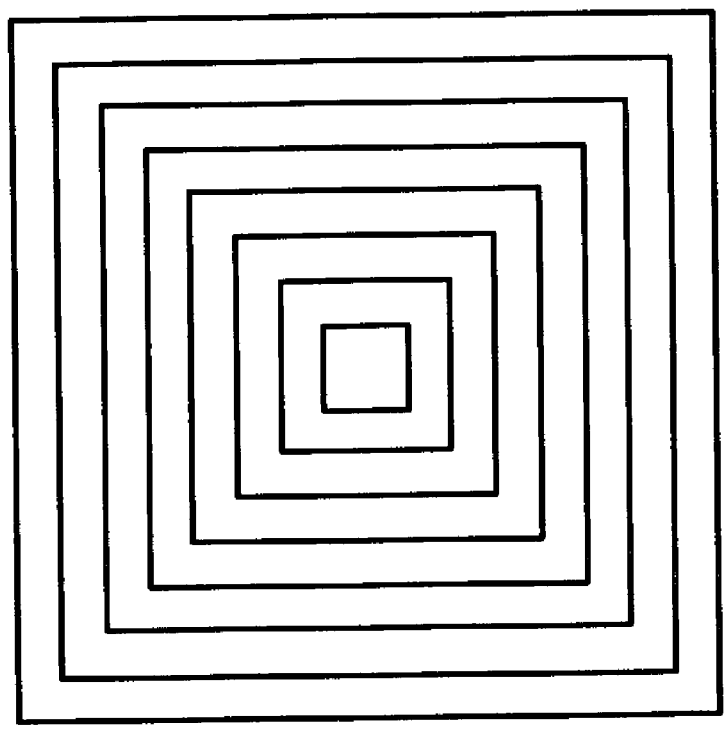
FIG. 23 shows a rectangular contour set that is not rotation invariant yet can be used for scale invariant matching.

Scale invariant matching can be achieved using methods that are similar to the rotation and scale invariant matching method described in section IV.2. However, the matching profiles include contour sets that are not rotation invariant. For example, a rectangular contour set could be used for scale invariant matching of a rectangular shaped pattern template. FIG. 23 shows an example of a rectangular contour set that is not rotation invariant yet could be used for fast scale invariant matching.

IV.4 Other Match Functions

In the previous sections, we used cross correlation as the match function. Other match functions such as normalized correlation and normalized covariance can also be used for matching.

Normalized correlation is defined as follows:

$$\text{Normalized\_correlation}(\text{Input}, \text{Pattern}) = \frac{\mu(\text{Input} * \text{Pattern}) - \mu(\text{Input})\mu(\text{Pattern})}{\sigma(\text{Pattern}) * \sigma(\text{Input})}$$

Where Input is the input profile and Pattern is the pattern template profile. Normalized correlation is useful for fine discrimination between the matches and when multiple patterns or patterns of different scales, aspect ratios, or rotations are involved. Since the patterns are not input image dependent, so μ(Pattern) and σ(Pattern) of the pattern template profiles can be pre-computed for each given scale or aspect ratio. They can be computed using the standard mean and standard deviation formula as follows:

$$\mu(\text{Pattern}) = \frac{\sum_{[i] \in \text{Pattern}} \text{Pattern}[i]}{\sum_{[i] \in \text{Pattern}} 1}$$

$$\sigma(\text{Pattern}) = \sqrt{\frac{\sum_{[i] \in \text{Pattern}} [\text{Pattern}[i] - \mu(\text{Pattern})]^2}{\sum_{[i] \in \text{Pattern}} 1 + 1}}$$

For a pattern template profile, let the number of bins be N, the values μ(Input*Pattern) of each location of the input image can be computed by $$\mu(\text{Input} * \text{Pattern}) = \frac{\text{invariant profile matching image}}{N}$$

and μ(Input) can be computed by $$\mu(\text{Input}) = \frac{\sum_{i=1}^{N} \text{Band}[i]}{N}$$

Where the image band of the pattern contour result corresponding to contour i is designated as Band [i].

The following formula can be used to compute σ(Input):

$$\sigma(\text{Input}) = \sqrt{\frac{\sum_{i=1}^{N} \text{Band}^2[i]}{N} - \mu^2(\text{input})}$$

To achieve efficient results, un-normalized cross correlation is first applied for each pattern and variation of pattern. The good match locations can then be determined for each pattern and variations of pattern. Normalized correlation can then be applied only to the good match locations of the patterns. The normalized correlation results of different patterns and variations of patterns are then compared to select the pattern, scale, rotation, and aspect ratio that yield top ranked normalized correlation results.

Those skilled in the art should recognize that other match functions such as normalized covariance could be implemented efficiently using the accumulation transformation and pattern kernel construction methods of this invention.

V. Match Selection

The match selection process finds good matches using the invariant profile matching image. In one embodiment of the invention, the good match locations are the locations having top ranked values in the match function result image. In another embodiment of the invention, the good match locations are the locations whose values in the invariant profile matching image are greater than a threshold. In yet another embodiment of the invention, the good match locations are the locations in the invariant profile matching image whose values are greater than a threshold and are ranked among the top ranked values. Those skilled in the art should recognize that other methods of match selection could be performed.

To achieve sub-pixel match accuracy, fitting of a match function around good match locations can be performed. In one embodiment of the invention, a least square polynomial fitting is conducted on the matching functions around the neighborhood of good match locations. The location of relative maxima can then be determined from the fitting parameters. Detailed implementation of fitting and relative maxima determination is described in Haralick R M and Shapiro L G, "Computer and Robot Vision", Vol. 1, Addison-Wesley, 1992, PP. 371–380.

Those skilled in the art should recognize that other models and methods of fitting could be used for parametric representation and match function and sub-pixel best match location determination. For example, spline functions rather than polynomials could be used.

The invention has been described herein in considerable detail in order to comply with the Patent Statutes and to provide those skilled in the art with the information needed to apply the novel principles and to construct and use such specialized components as are required. However, it is to be understood that the inventions can be carried out by specifically different equipment and devices, and that various modifications, both as to the implementation details and detailed procedures, can be accomplished without departing from the scope of the invention itself.

What is claimed is:

1. A fast invariant pattern search method comprising the steps of:
   a) Input an image;
   b) Input at least one pattern template invariant profile;
   c) Perform invariant profile generation using the input image to create at least one invariant profile image output wherein the invariant profile generation step further comprises the following steps:
      i) Perform at least one pattern contour set creation using the input image to create at least one pattern contour set output wherein the pattern contour set creation step further comprises the following steps:
         a. Perform accumulation transformation using the input image to create at least one accumulation image output;
         b. Perform a plurality of pattern construction steps to create a plurality of pattern results;
         c. Generate pattern contour result by subtracting consecutive pattern results to create at least one pattern contour result output,
      ii) Perform invariant profile construction using the at least one pattern contour set to create at least one invariant profile image output,
   d) Perform invariant profile matching using the at least one invariant profile image and the at least one pattern template invariant profile to create an invariant profile matching image output.

2. A fast invariant pattern search method comprising the steps of:
   a) Input an image;
   b) Input at least one pattern template invariant profile;
   c) Perform invariant profile generation using the input image to create at least one invariant profile image output wherein the invariant profile generation step further comprises the following steps:
      i) Perform at least one pattern contour set creation using the input image to create at least one pattern contour set output;
      ii) Perform invariant profile construction using the at least one pattern contour set to create at least one invariant profile image output wherein the invariant profile image output is a multi-band image;
   d) Perform invariant profile matching using the at least one invariant profile image and the at least one pattern template invariant profile to create an invariant profile matching image output.

3. A fast invariant pattern search method comprising the steps of:
   a) Input an image;

b) Input at least one pattern template invariant profile;
c) Perform invariant profile generation using the input image to create at least one invariant profile image output wherein the invariant profile generation step further comprises the following steps:
   i) Perform at least one pattern contour set creation using the input image to create at least one pattern contour set output;
   ii) Perform invariant profile construction using the at least one pattern contour set to create at least one invariant profile image output wherein the invariant profile image output is an expanded image;
d) Perform invariant profile matching using the at least one invariant profile image and the at least one pattern template invariant profile to create an invariant profile matching image output.

4. A fast invariant pattern search method comprising the steps of:
a) Input an image;
b) Input at least one pattern template invariant profile;
c) Perform invariant profile generation using the input image to create at least one invariant profile image output;
d) Perform invariant profile matching using the at least one invariant profile image and the at least one pattern template invariant profile to create an invariant profile matching image output wherein the invariant profile matching step performs rotation invariant matching wherein the rotation invariant matching generates the invariant profile matching image as weighted sum of the multiple image bands.

5. A fast invariant pattern search method comprising the steps of:
a) Input an image;
b) Input at least one pattern template invariant profile;
c) Perform invariant profile generation using the input image to create at least one invariant profile image output;
d) Perform invariant profile matching using the at least one invariant profile image and the at least one pattern template invariant profile to create an invariant profile matching image output wherein the invariant profile matching step performs rotation invariant matching wherein the rotation invariant matching comprises a multiple rotation invariant profile integration step that combines a plurality of rotation invariant profile matching images to create a rotation invariant profile matching image output wherein the multiple rotation invariant profile integration step takes the minimum of the plurality of rotation invariant profile matching images.

6. A fast invariant pattern search method comprising the steps of:
a) Input an image;
b) Input at least one pattern template invariant profile;
c) Perform invariant profile generation using the input image to create at least one invariant profile image output;
d) Perform invariant profile matching using the at least one invariant profile image and the at least one pattern template invariant profile to create an invariant profile matching image output wherein the invariant profile matching step performs rotation and scale invariant matching wherein the rotation and scale invariant matching comprises the following step:
   i) Perform a plurality of rotation and scale invariant matching using a plurality of pattern templates with different scales to create a plurality of rotation invariant profile matching image outputs;
   ii) Perform a multiple scale matching integration combining the plurality of rotation invariant profile matching images to create a rotation and scale invariant profile matching image output wherein the multiple scale matching integration step takes the minimum of the plurality of rotation invariant profile matching images.

7. An invariant profile generation method comprises the following steps:
a) Input an image;
b) Perform at least one pattern contour set creation using the input image to create at least one pattern contour set output wherein the pattern contour set creation step further comprises the following steps:
   i) Perform accumulation transformation using the input image to create at least one accumulation image output;
   ii) Perform a plurality of pattern construction steps to create a plurality of pattern results;
   iii) Generate pattern contour results by subtracting consecutive pattern results to create pattern contour result outputs,
c) Perform invariant profile construction using at least one pattern contour set to create at least one invariant profile image output.

8. An invariant profile generation method comprises the following steps:
a) Input an image;
b) Perform at least one pattern contour set creation using the input image to create at least one pattern contour set output;
c) Perform invariant profile construction using at least one pattern contour set to create at least one invariant profile image output wherein the invariant profile image output is a multi-band image.

9. An invariant profile generation method comprises the following steps:
a) Input an image;
b) Perform at least one pattern contour set creation using the input image to create at least one pattern contour set output;
c) Perform invariant profile construction using at least one pattern contour set to create at least one invariant profile image output wherein the invariant profile image output is an expanded image.

10. An invariant profile generation method comprises the following steps:
a) Input an image;
b) Perform at least one pattern contour set creation using the input image to create at least one pattern contour set output wherein the pattern contour set creation step further comprises the following steps:
   i. Perform accumulation transformation using the input image to create at least one accumulation image output;
   ii. Performs a plurality of pattern construction steps to create a plurality of pattern results;
   iii. Generate pattern contour results by subtracting consecutive pattern results to create pattern contour result outputs,
c) Perform invariant profile construction using the at least one pattern contour set to create at least one invariant profile image output wherein the invariant profile is normalized profile.

* * * * *